US009932976B2

(12) United States Patent
Cavatorta et al.

(10) Patent No.: US 9,932,976 B2
(45) Date of Patent: Apr. 3, 2018

(54) STARTING VALVE FOR A FLUID OPERATING MACHINE WORKING IN A VACUUM SYSTEM

(71) Applicant: GARDNER DENVER S.R.L., Lonate Pozzolo (IT)

(72) Inventors: Paolo Cavatorta, Lonate Pozzolo (IT); Umberto Tomei, Lonate Pozzolo (IT)

(73) Assignee: GARDNER DENVER S.R.L., Milan (IT)

( * ) Notice: Subject to any disclaimer, the term of this patent is extended or adjusted under 35 U.S.C. 154(b) by 0 days.

(21) Appl. No.: 14/902,793

(22) PCT Filed: Jul. 4, 2014

(86) PCT No.: PCT/EP2014/064388
§ 371 (c)(1),
(2) Date: Jan. 4, 2016

(87) PCT Pub. No.: WO2015/001118
PCT Pub. Date: Jan. 8, 2015

(65) Prior Publication Data
US 2016/0169217 A1    Jun. 16, 2016

(30) Foreign Application Priority Data

Jul. 5, 2013  (IT) .............................. BO2013A0351

(51) Int. Cl.
*F16K 31/128*  (2006.01)
*F04B 37/14*  (2006.01)
*F04B 53/10*  (2006.01)
*F16K 51/02*  (2006.01)
*F04C 28/06*  (2006.01)

(52) U.S. Cl.
CPC .............. *F04B 37/14* (2013.01); *F04B 53/10* (2013.01); *F16K 31/128* (2013.01); *F16K 51/02* (2013.01); *F04C 28/06* (2013.01); *F04C 2220/10* (2013.01)

(58) Field of Classification Search
CPC .......... F04B 37/14; F04B 53/10; F16K 51/02; F16K 31/128; F16K 31/122;
(Continued)

(56) References Cited

U.S. PATENT DOCUMENTS 4,366,834 A   1/1983   Hanson et al.
4,613,111 A   9/1986   Paquet et al.
(Continued)

FOREIGN PATENT DOCUMENTS

CN    1488048 A    4/2004

OTHER PUBLICATIONS

PCT International Search Report and Written Opinion for Application No. PCT/EP2014/064388 dated Aug. 8, 2014 (10 pages).
(Continued)

*Primary Examiner* — Ian Paquette
(74) *Attorney, Agent, or Firm* — Michael Best & Friedrich LLP

(57) ABSTRACT

A starting valve (100) for a fluid operating machine (200) for a vacuum system (1000). The starting valve (100) comprises:—a valve body (10) with an opening (17) to let a gas in; and an actuating piston (13) splined on a stem (16) free to slide in a guide (18A). The actuating piston (13), with a portion of the valve body (10), defines a chamber (30). The actuating piston (13) is subject to the action of a deformable diaphragm (15). A calibrated throttling hole (16B) is provided in series with a through hole (16A) in line with the stem (16) to establish a fluid communication between the chamber (30) and a fluid-dynamic line (500) of the vacuum system (1000). A shutter (20) is furthermore provided also splined on the stem (16). The shutter (20) closes a gas passage opening (10B) as a function of the pressure difference between the chamber (30) and the fluid-dynamic line (500). The calibrated throttling hole (16B) and the through (Continued)

hole (16A) establish a fluid communication between the space enclosed by a connection (25) and a space (22) defined by a cover element (23) positioned in the upper part of the valve body (10).

17 Claims, 4 Drawing Sheets

(58) Field of Classification Search
CPC ............ F16K 31/1221; F16K 31/1223; F16K 31/1262; F04C 2220/10; F04C 28/06
USPC .......................... 251/62, 63, 63.4, 63.5, 63.6
See application file for complete search history.

(56) References Cited

U.S. PATENT DOCUMENTS

| | | |
|---|---|---|
| 4,785,851 A | 11/1988 | Peacock |
| 5,172,722 A | 12/1992 | Nishimura |
| 8,196,893 B2 * | 6/2012 | Grout .................. F16K 1/36 |
| | | 137/375 |
| 8,671,987 B2 * | 3/2014 | Gu ...................... F16K 1/52 |
| | | 137/630 |
| 9,267,614 B2 * | 2/2016 | Yamada ............ F16K 31/126 |
| 2009/0057600 A1 | 3/2009 | Watanabe et al. |
| 2013/0136638 A1 * | 5/2013 | Foerster .............. F04C 28/06 |
| | | 418/1 |

OTHER PUBLICATIONS

Office Action from the State Intellectual Property Office of the People's Republic of China for Application No. 201480044284.2 dated Dec. 21, 2016.

Examination Report No. 1 from the Intellectual Property Office of Australia for Application No. 2014286067 dated Mar. 16, 2017 (2 pages).

* cited by examiner

US 9,932,976 B2

STARTING VALVE FOR A FLUID OPERATING MACHINE WORKING IN A VACUUM SYSTEM

CROSS-REFERENCE TO RELATED APPLICATIONS

This is a U.S. national stage entry of International Patent Application No. PCT/EP2014/064388, filed on Jul. 4, 2014, which claims priority to Italian Patent Application No. BO2013A000351, filed on Jul. 5, 2013, the entire contents of all of which are fully incorporated herein by reference.

TECHNICAL FIELD

The present invention concerns a starting valve for a fluid operating machine working in a vacuum system.

Furthermore, the present invention refers to a vacuum system comprising the above-mentioned starting valve.

BACKGROUND ART

In the technique for circulation and compression of gas, in particular air, the use of starting valves which facilitate starting of the compressors or blowers in the presence of a backpressure at the system outlet is fairly common.

The presence of said backpressure generates a load on the compressor even with the machine at a standstill, consequently determining a sudden high electricity requirement and therefore an overload at starting of the operating machine such as to prevent the operation thereof due to the high current absorption of the electric starting motor.

Currently starting valves exist on the market which permit no-load operation for a temporary period, thus allowing operation of the compressors and blowers to be correctly controlled, avoiding undesired overloads.

The appropriate starting valve is chosen according to the system operating pressure and the volume of gas to be treated.

The presence of such a starting valve allows elimination of the starting overload, equalising the pressure between the compressor inlet and outlet, thus eliminating the pressure difference which would otherwise generate the high initial overload.

Immediately after, the starting valve progressively closes until it reaches the valve calibration value, which corresponds to the operating pressure of the entire system.

The gradual closing of the starting valve allows a progressive load to be generated on the operating machine and therefore on the operating machine electric starting motor.

However, the starting valves currently present on the market do not allow a degree of precision in pressure adjustment such that they may be successfully applied in both pressure and vacuum applications.

Therefore, the aim of the present invention is to conceive a starting valve which has a high pressure adjustment precision also in systems with fluid operating machines working in a vacuum.

For production of the present starting valve, the already consolidated construction criteria of simplicity and inexpensiveness of the well-known pressure applications have been used.

The present starting valve is particularly useful in all vacuum applications with a low expansion ratio (i.e. a ratio between the atmospheric pressure and the absolute operating pressure of the system no higher than 5) with high gas flow rates.

The present starting valve, in addition to facilitating starting of the operating machines, has the function of guaranteeing the maintenance of a constant working pressure (±1% of the required pressure), a factor which has proved to be fundamental for correct efficient operation in these types of applications.

DISCLOSURE OF INVENTION

The main object of the present invention is therefore to provide a starting valve which, in a vacuum system, prevents the operating machine working in conditions of excessive overload with consequent energy saving, or working at values below those relative to the optimum process operating conditions.

A further object of the present invention is to provide a vacuum system comprising at least one above-mentioned starting valve.

According to the present invention, therefore, a starting valve and a vacuum system which integrates such valve are provided according to the respective independent claims or any of the claims depending directly or indirectly on the independent claims.

BRIEF DESCRIPTION OF THE DRAWINGS

For a better understanding of the present invention, some preferred embodiments are now described, purely by way of non-limiting examples and with reference to the accompanying drawings, in which.

BEST MODE FOR CARRYING OUT THE INVENTION

Figure 1:
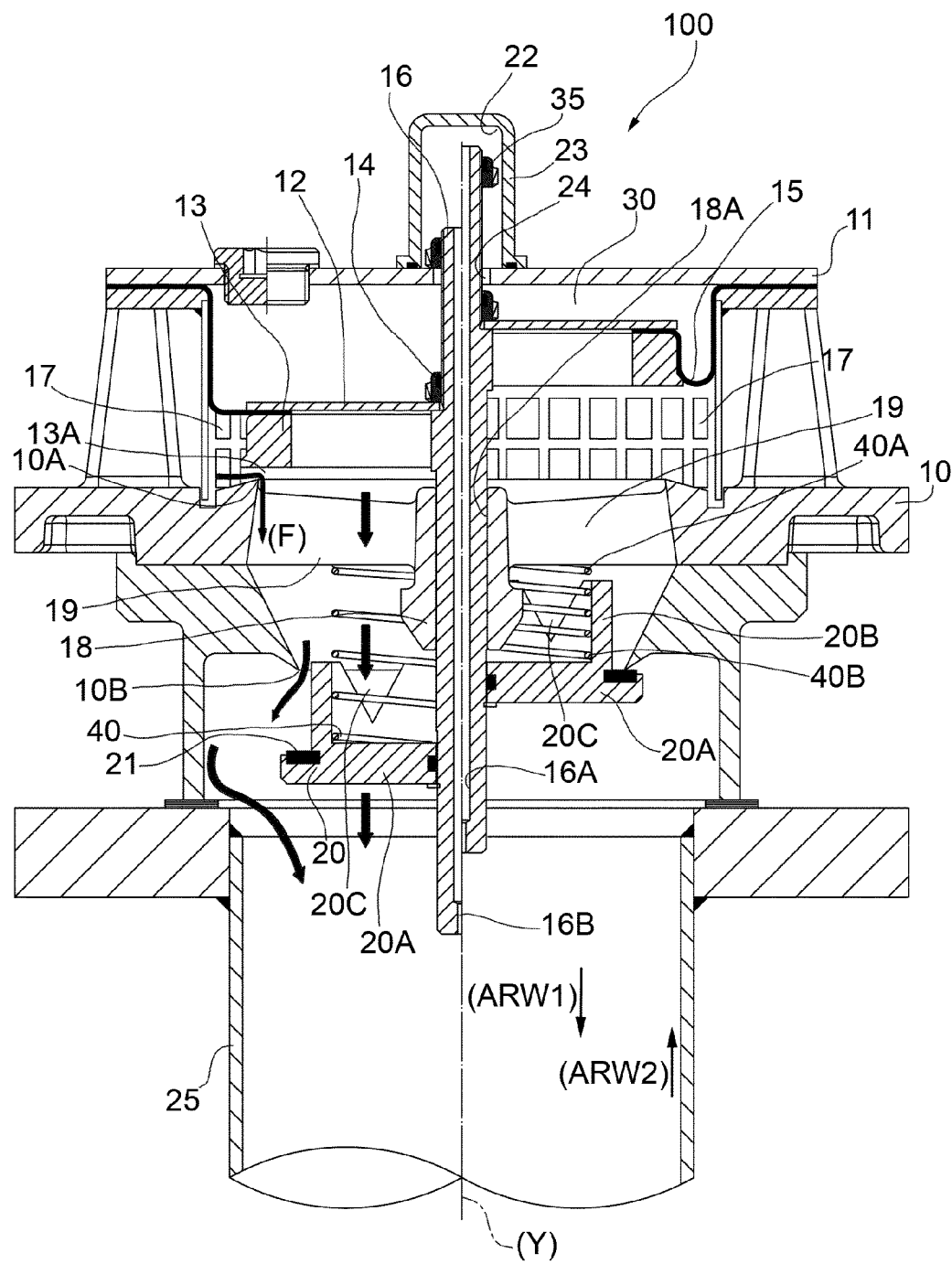
FIG. 1 illustrates a longitudinal section of a starting valve produced according to the teachings of the present invention.
Figure 2:
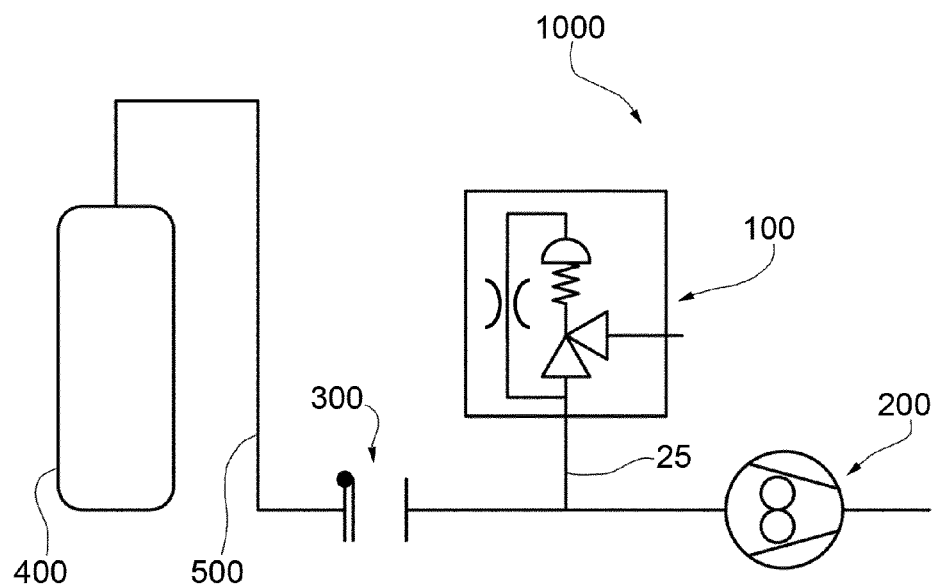
FIG. 2 shows a first configuration of a vacuum system comprising a starting valve of the type illustrated in FIG. 1.

In FIG. 1, the number 100 indicates, as a whole, a starting valve integrated in a vacuum system 1000 (FIG. 2, 3, 4).

Figure 3:
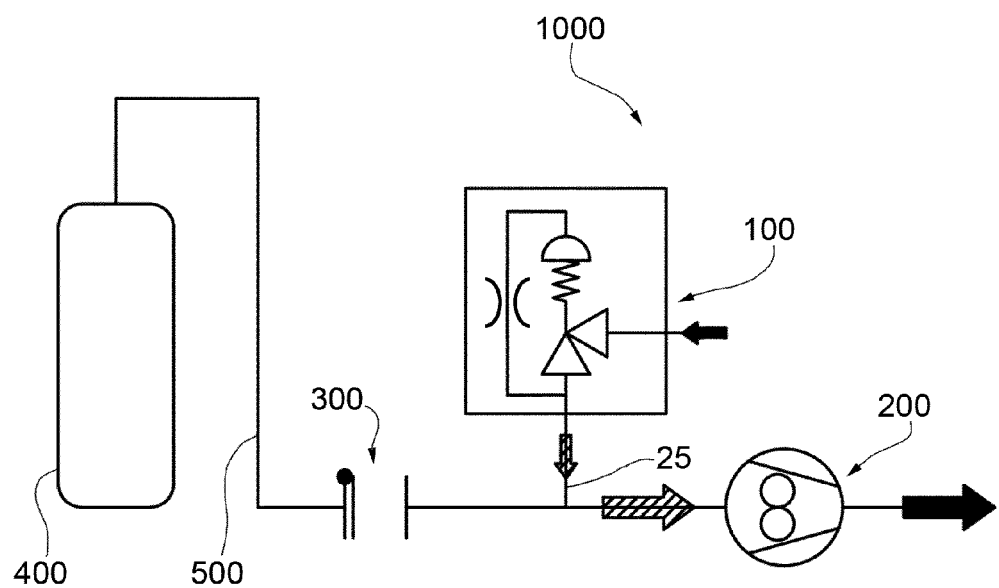
FIG. 3 illustrates a second configuration of a vacuum system comprising a starting valve of the type illustrated in FIG. 1.
Figure 4:
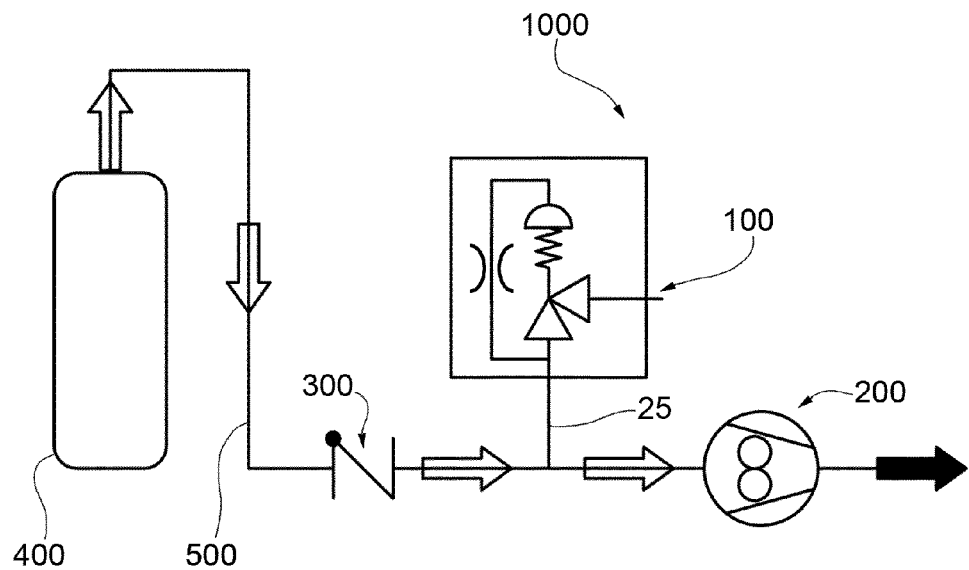
FIG. 4 shows a third configuration of a vacuum system comprising a starting valve of the type illustrated in FIG. 1.

Incidentally, as illustrated in the attached FIGS. 2, 3, 4, the vacuum system 1000 comprises, in addition to the mentioned starting valve 100, an operating machine 200 positioned downstream of said starting valve 100.

The vacuum system 1000 furthermore comprises a check valve 300 positioned between the starting valve 100 and a vacuum utility 400.

A fluid-dynamic line 500 connects the vacuum utility 400, the check valve 300, the starting valve 100 and the operating machine 200 positioned in series with respect to one another.

The FIGS. 2, 3, 4 will be referred to again below when describing operation of the starting valve 100 in the context of the overall operation of the vacuum system 1000 (see below).

As illustrated in greater detail in FIG. 1, the starting valve 100 comprises the following elements:

a valve body 10;

a cover 11;

a plate 12 of an actuating piston 13; said actuating piston 13 may rest on the edge of an air passage opening 10A which is inside the valve body 10; note that, even when the actuating piston 13 rests on the edge of the first air passage opening 10A, on said actuating piston 13 there is an orifice 13A which is always open and which always allows the passage of an air flow (F) in all operating conditions of the valve 100;

a locking ring nut 14;

a deformable diaphragm 15 connected to the plate 12 and to the actuating piston 13;

a stem 16 on which the plate 12 is splined by means of the locking ring nut 14;

a plurality of openings 17 provided on the valve body 10 crossed, in use, by the above-mentioned air flow (F) coming from the external environment (see below);

a central hub 18 supported by the valve body 10 by means of a plurality of spokes 19 (only two spokes 19 may be seen in FIG. 1); the central hub 18 being provided with a central through hole 18A crossed, in use, by the stem 16 which is free to slide inside said hole 18A along a central axis of symmetry (Y) in a first direction (ARW1) downwards or in a second direction (ARW2) upwards;

a shutter 20 also splined on the stem 16; said shutter being provided with a seal gasket 21 suited to close a second air passage opening 10B; furthermore, the shutter 20 advantageously has the form of a cup-shaped body comprising a bottom 20A integral with a cylindrical collar 20B provided with a plurality of through openings 20C; note that both the actuating piston 13 and the shutter 20 are splined on the stem 16;

a through hole 16A which longitudinally extends (along the above-mentioned axis(Y)) through the stem 16 and comprising a calibrated hole 16B; said through hole 16A establishes a fluid connection between the space enclosed by a connection 25 and a space 22 defined by a cover 23 in the upper part of the valve body 10; note, furthermore, that on the cover 11 an air orifice 24 is provided (in the shape of a circular crown) which establishes a fluid connection between the space 22 and a chamber 30 below defined at the top by the cover 11, at the bottom by the assembly consisting of the plate 12 and the deformable diaphragm 15, and centrally by the substantially cylindrical surface of the stem 16; furthermore, as illustrated in FIG. 1, the upper end of the stem 16 is free to slide in the space 22; moreover, at the upper end of the stem 16 a ring nut 35 is fixed which, in a particular configuration of the system, is used to limit the opening of the valve; and a helical spring 40 having an upper end 40A resting on the spokes 19, and a lower end 40B resting on the upper surface of the bottom 20A; therefore the shutter 20 is subject to a first action transmitted to it by the stem 16 and to a second elastic action imparted by the helical spring 40 (see below).

Although in FIG. 1 the openings 20C have a triangular shape for the sake of simplicity said openings 20C may have different shapes and sizes (half-circle, square, rectangle etc.) so that the air flow passage area increases more or less progressively as a function of the movement of the stem 16.

This particular feature allows operation of the present valve to be adapted, simply and effectively, to a wider operating field.

Note that the connection 25 is used to hydraulically connect the valve 100 to the fluid-dynamic line 500 (FIGS. 2, 3, 4).

Operation of the starting valve 100 will be described below with reference also to the diagrams of the vacuum system 1000 given in FIGS. 2, 3, 4:

in the initial configuration of the starting valve 100 shown in the left-hand part of FIG. 1, the shutter 20 is not resting on the edge of the opening 10B and the operating machine 200 (FIG. 2) is at a standstill; therefore, in this initial configuration the starting valve 100 is kept open by the helical spring 40;

when the operating machine 200 is activated (FIG. 3) the external air is sucked from the external environment through the openings 17 (arrow (F)) and flows across the through holes 20C; this causes a drop in pressure across the through openings 20C present on the collar 20B of the shutter 20, thus inducing closing of the starting valve 100 in an adjustable time;

the pressure drop generated in the shutter 20 propagates slowly through a calibrated throttling hole 16B and the through hole 16A to the chamber 30 (via the orifice 24) located above the actuating piston 13; this causes a difference in forces between the two sides of the actuating piston 13 due to the difference in the surfaces on which the vacuum acts; said force causes movement of the actuating piston 13 upwards (arrow (ARW2)), further increasing the pressure drop and consequently increasing the force that causes the upward movement of the actuating piston 13 (arrow (ARW2)) until complete closure of the starting valve 100 due to the fact that the seal gasket 21 now rests on the edge of the opening 10B (see the right-hand part of FIG. 1); this concludes the starting phase of the operating machine 200 (FIG. 4).

Advantageously, but not necessarily, the through hole 16A has a diameter greater than or equal to 1 mm (in particular 2 mm), while the calibrated throttling hole 16B has a diameter ranging from 0.10 mm to 3 mm (in particular 0.20 mm).

During functioning of the operating machine 200 the starting valve 100 (FIG. 4) remains closed due to the difference between the forces generated by the same pressure that acts on the different surfaces of the actuating piston 13 and the shutter 20.

When the operating machine 200 stops, due to closing of the fluid-dynamic line 500 owing to the presence of the check valve 300 positioned upstream of the starting valve 100 (see FIG. 2), below the shutter 20 the atmospheric pressure is restored and, through the calibrated throttling hole 16B and the hole 16A, the atmospheric pressure is restored also in the chamber 30.

At this point, the force of the spring 40, no longer countered by the forces induced by the vacuums, causes the starting valve 100 to open (pushing the shutter 20 downwards; arrow (AWR1)), which returns to the initial configuration shown in the left-hand part of FIG. 1, ready for a new start.

To regulate the closing time of the starting valve 100, the position of the ring nut 35 must be adjusted.

By tightening the ring nut 35 around the stem 16, the shutter 20 is moved closer to the opening 10B (in its initial configuration shown in the left-hand part of FIG. 1) reducing the closing time of the starting valve 100; by loosening the ring nut 35 the shutter 20 is moved away from the opening 10B, proportionally increasing the closing time of the starting valve 100.

Figure 6:
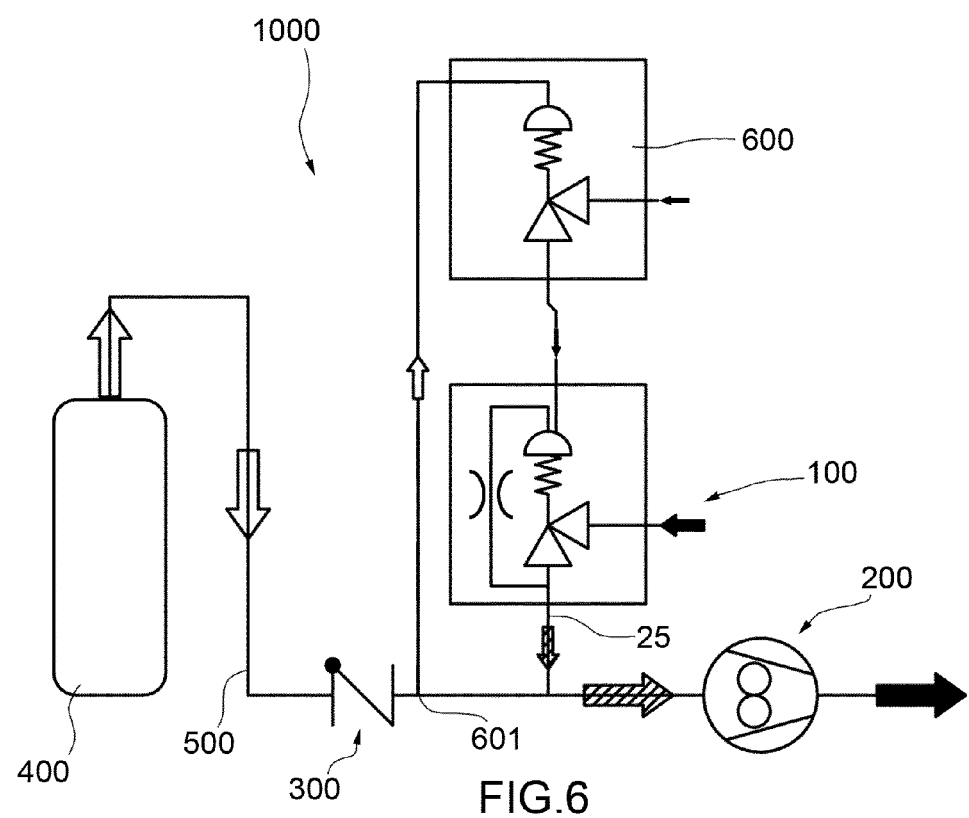
FIG. 6 shows the starting valve and the pilot valve of FIG. 5 integrated in a vacuum system.

During functioning of the operating machine 200 there is the need to accurately maintain or limit the vacuum required by the system and this may be done by combining with the starting valve 100 described above a control device 600 (FIGS. 5, 6) described below.

Figure 5:
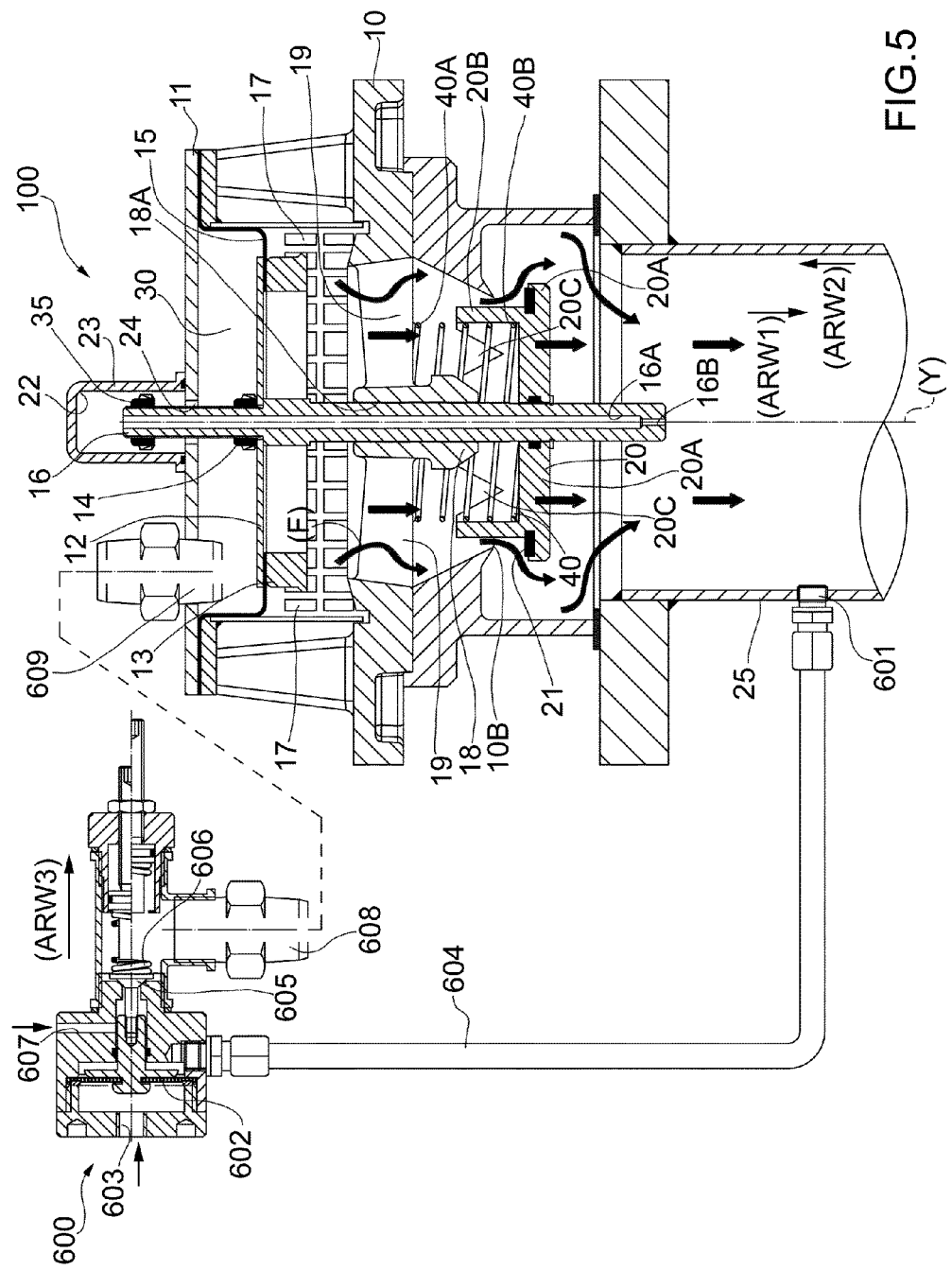
FIG. 5 illustrates a starting valve of the type illustrated in FIG. 1 associated with a relative pilot valve.

The control device 600 is obtained via the use of a direct action pressure limiting valve, installed on the cover 11 of the starting valve 100 (FIG. 5).

The operating depression of the vacuum system 1000 is detected by the control device 600 by means of a pressure fitting 601 positioned on the connection 25 (FIG. 5) or directly on the fluid-dynamic line 500.

The control device 600 therefore reacts to the vacuum variations by varying in turn the flow of atmospheric air to the chamber 30 of the starting valve 100.

If, for example, the depression of the vacuum system 1000 increases, the control device 600 detects the pressure variation by means of a diaphragm 602 which is subject on one side to the atmospheric pressure through a hole 603, and on the other side to the depression of the vacuum system 1000 via a duct 604.

The pressure difference on the diaphragm 602 causes a shutter 605 to move in the direction of an arrow (ARW3) (FIG. 5). In its movement, the shutter 605 compresses a spring 606.

The movement of the shutter 605 establishes a communication, through a passage hole 607, between the external environment at atmospheric pressure and the chamber 30 of the starting valve 100 via two connections 608, 609 (FIG. 5).

Consequently the pressure of the chamber 30 increases, causing the shutter 20 of the starting valve 100 to move downwards (in the direction of the arrow (ARW1)), thus increasing the quantity of air that enters the vacuum system through the openings 17 of the starting valve 100 until a new condition of equilibrium is reached.

If the depression of the vacuum system drops, the behaviour of the control device 600 and of the starting valve will be exactly opposite to the one just described, reducing the intake of atmospheric air from the passage hole 607 until a new condition of equilibrium is reached.

The main advantages of the starting valve according to the invention may be summarised in the following points:

- no-load operation is guaranteed for the vacuum applications, with the purpose of limiting maximum energy absorption during the inrush phase at start-up of the operating machine; this new mechanical configuration of the valve allows greater valve opening precision, prevents the operating machine working in conditions of excessive overload with consequent energy saving, or working at values below those relative to the optimum process operating conditions;
- the maintenance of a system operating pressure with a high precision (±1% of the required pressure) may be guaranteed by the use of an appropriate control element if necessary;
- the actuation function is combined with the shuttering function for negative pressures in the same mechanical element (these functions are normally separate in the valves currently existing on the market); this avoids the usual construction complications;
- the possibility, in the configuration of this valve, of integrating an element for shuttering the flow rate such as to extend the field of application of the valve to a wider than normal operating field, both for vacuum and pressure applications, avoiding the operating instability which today occurs in the presence of significant flow rate reductions (30% of the rated flow rate) in the valve and in the system as a whole; and
- the number of component elements of the valve has been reduced having adopted a single-acting actuator system with one single chamber on which the pressure operates, contrarily to the double-acting systems and systems with dual chamber present on the market.

What is claimed is:

1. A starting valve for a fluid operating machine working in a vacuum system, the starting valve comprising:
    a valve body, which is provided with at least one opening to let a gas in; and
    an actuating piston, which is splined on a stem, which is free to slide in guide means; said actuating piston defining a chamber together with a portion of said valve body; said actuating piston being subject to the action of a deformable diaphragm, wherein a calibrated throttling hole in series with a through hole are provided, which longitudinally extend through said stem; said holes establishing a fluid connection between said chamber and a fluid-dynamic line of said vacuum system,
    wherein the starting valve comprises, furthermore, a shutter, which is also splined on said stem; said shutter being suited to close a gas passage opening as a function of the pressure difference existing between said chamber and said fluid-dynamic line,
    the starting valve characterized in that said calibrated throttling hole and said through hole establish a fluid communication between a space enclosed by a connection and a space defined by a covering element positioned in the upper part of said valve body,
    and wherein the space defined by the covering element and the chamber are in fluid communication between each other by means of an air passage orifice.

2. A starting valve according to claim 1, characterized in that said through hole has a diameter greater than or equal to 1 mm, while the calibrated throttling hole has a diameter ranging from 0.10 mm to 3 mm.

3. A starting valve according to claim 1, characterized in that said shutter is subject to elastic forces generated by an elastic element.

4. A starting valve according to claim 1, characterized in that the starting valve comprises fluid connection means for the connection to a control device, which reacts to the vacuum variations by directly varying the flow of atmospheric air to said chamber.

5. A vacuum system comprising at least one starting valve according to claim 1.

6. A starting valve according to claim 1, characterized in that said shutter is shaped as a cup-shaped body and comprises a bottom, to which a cylindrical collar is integral, which is provided with a plurality of through openings.

7. A starting valve according to claim 6, characterized in that said openings have different shapes and sizes such that the passage area of the air flow increases as a function of the movement of said stem.

8. A starting valve according to claim 7, characterized in that the upper end of said stem may freely slide in said space defined by said covering element.

9. A starting valve according to claim 8, characterized in that the upper end of said stem is fixed to a ring nut, which is used to limit the opening of the starting valve itself.

10. A starting valve for a fluid operating machine working in a vacuum system, the starting valve comprising:
    a valve body, which is provided with at least one opening to let a gas in; and an actuating piston, which is splined on a stem, which is free to slide in guide means; said actuating piston defining a chamber together with a portion of said valve body; said actuating piston being subject to the action of a deformable diaphragm, wherein a calibrated throttling hole in series with a through hole are provided, which longitudinally extend through said stem; said holes establishing a fluid connection between said chamber and a fluid-dynamic line of said vacuum system, wherein the starting valve comprises, furthermore, a shutter, which is also splined on said stem; said shutter being suited to close a gas passage opening as a function of the pressure difference existing between said chamber and said fluid-dynamic line, the starting valve characterized in that said calibrated throttling hole and said through hole establish a fluid communication between a space enclosed by a connection and a space defined by a covering element positioned in the upper part of said valve body, and wherein the shutter is shaped as a cup-shaped body and comprises a bottom, to which a cylindrical collar is integral, which is provided with a plurality of through openings.

11. A vacuum system comprising at least one starting valve according to claim 10.

12. A starting valve according to claim 10, characterized in that said openings have different shapes and sizes such that the passage area of the air flow increases as a function of the movement of said stem.

13. A starting valve according to claim 12, characterized in that the upper end of said stem may freely slide in said space defined by said covering element.

14. A starting valve according to claim 13, characterized in that the upper end of said stem is fixed to a ring nut, which is used to limit the opening of the starting valve itself.

15. A starting valve for a fluid operating machine working in a vacuum system, the starting valve comprising:

a valve body, which is provided with at least one opening to let a gas in; and an actuating piston, which is splined on a stem, which is free to slide in guide means; said actuating piston defining a chamber together with a portion of said valve body; said actuating piston being subject to the action of a deformable diaphragm, wherein a calibrated throttling hole in series with a through hole are provided, which longitudinally extend through said stem; said holes establishing a fluid connection between said chamber and a fluid-dynamic line of said vacuum system, wherein the starting valve comprises, furthermore, a shutter, which is also splined on said stem; said shutter being suited to close a gas passage opening as a function of the pressure difference existing between said chamber and said fluid-dynamic line, the starting valve characterized in that said calibrated throttling hole and said through hole establish a fluid communication between a space enclosed by a connection and a space defined by a covering element positioned in the upper part of said valve body, the space defined by the covering element configured to receive a portion of the stem.

16. A starting valve according to claim 15, characterized in that said through hole has a diameter greater than or equal to 1 mm, while the calibrated throttling hole has a diameter ranging from 0.10 mm to 3 mm.

17. A vacuum system comprising at least one starting valve according to claim 15.

\* \* \* \* \*